(12) United States Patent
Kuldkepp et al.

(10) Patent No.: US 10,789,464 B2
(45) Date of Patent: *Sep. 29, 2020

(54) APPARATUS AND METHOD FOR ROBUST EYE/GAZE TRACKING

(71) Applicant: Tobii AB, Danderyd (SE)

(72) Inventors: Mattias Kuldkepp, Sollentuna (SE); Marten Skogo, Danderyd (SE); Mattias Hanqvist, Stockholm (SE); Martin Brogren, Stockholm (SE); Dineshkumar Muthusamy, Vallentuna (SE)

(73) Assignee: Tobii AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,951

(22) Filed: Apr. 9, 2019

(65) Prior Publication Data
US 2019/0236356 A1 Aug. 1, 2019

Related U.S. Application Data

(63) Continuation of application No. 15/480,216, filed on Apr. 5, 2017, now Pat. No. 10,282,608, and a (Continued)

(30) Foreign Application Priority Data

Feb. 21, 2014 (GB) .................................. 1403077.9

(51) Int. Cl.
*G06K 9/00* (2006.01)
*G06F 3/01* (2006.01)
(Continued)

(52) U.S. Cl.
CPC ......... *G06K 9/00604* (2013.01); *G06F 3/013* (2013.01); *G06K 9/0061* (2013.01); *G06K 9/00617* (2013.01); *G06T 7/30* (2017.01); *G06T 7/38* (2017.01); *G06T 7/74* (2017.01); *H04N 5/2259* (2013.01); *H04N 5/23219* (2013.01); *H04N 5/247* (2013.01); *H04N 5/2628* (2013.01); *G06F 3/017* (2013.01);
(Continued)

(58) Field of Classification Search
CPC .................................................. G06K 9/00604
See application file for complete search history.

(56) References Cited

U.S. PATENT DOCUMENTS

| | | | | |
|---|---|---|---|---|
| 2010/0066975 A1* | 3/2010 | Rehnstrom | .......... | A61B 3/0008 351/210 |
| 2011/0279666 A1* | 11/2011 | Strombom | ......... | G06K 9/00604 348/78 |

(Continued)

*Primary Examiner* — Oneal R Mistry
(74) *Attorney, Agent, or Firm* — Samuel Yamron

(57) ABSTRACT

At least one image registering unit records at least one series of images representing a subject. A control unit controls an operation sequence for the at least one image registering unit in such a manner that a subsequent data processing unit receives a repeating sequence of image frames there from, wherein each period contains at least one image frame of a first resolution and at least one image frame of a second resolution being different from the first resolution. Based on the registered image frames, the data processing unit produces eye/gaze tracking data with respect to the subject.

18 Claims, 6 Drawing Sheets

Related U.S. Application Data continuation of application No. 14/622,594, filed on Feb. 13, 2015, now Pat. No. 9,646,207.

(51) Int. Cl.
    *H04N 5/225*    (2006.01)
    *H04N 5/232*    (2006.01)
    *H04N 5/247*    (2006.01)
    *H04N 5/262*    (2006.01)
    *G06T 7/30*     (2017.01)
    *G06T 7/73*     (2017.01)
    *G06T 7/38*     (2017.01)

(52) U.S. Cl.
    CPC ............... *G06T 2207/10016* (2013.01); *G06T 2207/30201* (2013.01)

(56) References Cited

U.S. PATENT DOCUMENTS

| | | | |
|---|---|---|---|
| 2012/0105486 A1* | 5/2012 | Lankford | G06F 3/0481 345/661 |
| 2014/0375541 A1* | 12/2014 | Nister | G06F 3/013 345/156 |

\* cited by examiner

APPARATUS AND METHOD FOR ROBUST EYE/GAZE TRACKING

CROSS REFERENCE TO RELATED APPLICATION(S)

This application is a continuation application of U.S. patent application Ser. No. 15/480,216, filed on Apr. 5, 2017, of the same title, which is an is a continuation application of U.S. patent application Ser. No. 14/622,594, filed on Feb. 13, 2015 of the same title, which, in turn, claims priority to United Kingdom Patent Application No. 1403077.9 filed on Feb. 21, 2014; the contents of each of which are also incorporated herein by reference.

FIELD OF THE INVENTION

The present invention relates generally to solutions for producing eye and/or gaze tracking data with respect to a subject, e.g. a person in front of a computer screen.

BACKGROUND OF THE INVENTION

Solutions for automatically tracking a person's eyes have been known for many years. Eye tracking is understood as the process of measuring the motion of an eye relative to the head, whereas gaze tracking is the process of determining the point of gaze (i.e. where a subject is looking). Consequently, an eye/gaze tracker is a device for measuring eye positions and/or eye movements. Eye/gaze trackers are used in research on the visual system, in psychology, in cognitive linguistics and for controlling various computer systems. An eye/gaze tracker may also be employed in vehicles to determine driver drowsiness or to enable interaction with interior displays. There are a number of different methods for measuring eye movement. However, the most popular variants use video images from which the eye position is extracted.

It is often challenging to find the subject's eyes in the video data, and thereafter maintain tracking thereof. Normally, an initial set of image data represents a larger view of a scene, and then, after having identified eye candidates, only the region on the imaging sensor corresponding to where the eyes are located is read out. Namely, this decreases the average bandwidth need, as well as increases the image sensor read-out frequency. Hence, the effects of any non-controlled light sources due to shorter read out times can be reduced. This strategy is generally referred to as image cropping, windowing or applying an ROI (region of interest) or an AOI (area of interest). When doing so, the image size becomes small, however typically, in each image, the highest possible resolution that the sensor can provide is used.

A generally efficient method of finding and tracking an object (such as a face or particular features therein) is to use image-based recognition techniques that are based on other algorithms than those being most efficient for gaze tracking. Namely, the objects that are identified and subsequently processed differ significantly in size and shape. Therefore, for feature recognition it is beneficial to use the camera's full field of view. Further, in eye tracking, when using only ROI images there is a risk that the eye tracker "locks in" to an eye candidate which in fact is not an eye. Hence, it may be useful to switch from a wide field of view to an ROI (after having found a subject's eyes), and then switch back to a wide field of view, in case one or more eyes fall outside of the ROI. This is also beneficial in situations where multiple subjects are located in front of the eye tracker.

WO2008/107713 discloses a method and apparatus for image processing for object recognition applications. Here, first, an image is acquired at relatively low resolution of a relatively wide field of view. A pattern recognition algorithm is applied to the first image to identify objects of interest. After having determined at least one object of interest and its coordinates within the image, either the same image capture device or an additional image capture device is controlled so as to obtain a sequence of second, relatively high resolution images of a relatively narrow field of view containing the at least one object of interest.

US 2009/0219387 describes an automatic video surveillance system, wherein, initially, a video camera registers a series of low resolution images. This video data is analyzed, and based thereon, at least one region of interest is determined in a scene acquired by the video camera. The at least one region of interest is tracked at a resolution level that is higher than that of the initial series of images. The higher resolution level is dynamically selected so that important details within a scene receive appropriate scrutiny while uninteresting areas are imaged at a lower resolution. Preferably, the subsequent video data are registered in parallel with different exposure levels to provide a greater dynamic range, and thus improved image quality.

Hence, there are examples of prior-art solutions where image data are initially registered at comparatively low resolution, and subsequently, particularly interesting areas are tracked at higher resolution and/or improved image quality. In the context of this invention, the term "resolution of an image", "resolution" or other such terms is intended to refer to how large the field of view imaged per pixel is. More specifically, the resolution is how large the imaged field of view is divided by the number of pixels, i.e. the horizontal field of view of the image divided by the image width in pixels, or the vertical field of view that is imaged divided by the image height in pixels. Thus, an image of relatively high resolution has many pixels per degree field of view, whereas an image of relatively low resolution has fewer pixels per degree field of view.

Nevertheless, in order to attain a robust eye/gaze tracking system it is important to repeatedly verify that the "eyes" being tracked indeed correspond to the image elements being the best eye candidates in the full camera field of view.

For gaze tracking it is well known that (given the gaze angle, eye position and corneal radius) the relative position of an illuminator and a camera determines the position of the sharp reflection of said illuminator on the cornea. The reflection, or glint, may sometimes be unfavorably positioned for gaze tracking, for instance by causing reflections in eye glasses, obscuring large portions of the pupil, or coinciding with a region of the cornea, which is poorly represented by the eye model used.

In such situations, on one hand, it would be highly desirable if information from any other illuminators of the system could be used. On the other hand, a system in which illuminators can be selected adaptively would be associated with problems in terms of testability and repeatability because such a system would show a different behavior in different situations. Moreover, any hardware-related problems with respect to stability (e.g. caused by uneven and unpredictable heat distributions) as well as any visible flicker from low frequency components caused by random switching between illuminators can be prevented by having a repeatable behavior of the system.

SUMMARY OF THE INVENTION

The object of the present invention is to mitigate the above problems, and thus offer a more robust and stable eye/gaze tracking solution.

According to one aspect of the invention, the object is achieved by the initially described apparatus, wherein the control unit is configured to control the operation sequence for the image registering unit, such that the series of images received by the data processing unit represents a repeating sequence of image frames. Further, each period contains at least one image frame of a first resolution and at least one image frame of a second resolution being different from the first resolution.

This apparatus is advantageous because, on one hand, image-based feature recognition techniques can be employed, for instance by using the image frame of the first resolution or the image frame of the second resolution. Some possible feature recognition techniques include the detection of facial gestures, hand gestures, facial features, facial expressions, eye closure, identification data and identity recognition of a person imaged by the image frame. On the other hand, the most efficient gaze tracking algorithms can be applied, for instance on the image frames of the second resolution. Consequently, it is possible to combine reliable feature tracking with high-quality eye/gaze tracking in a common and robust implementation.

According to one preferred embodiment of this aspect of the invention, the image registering unit contains an image sensor having a set of sensor elements. Moreover, the image registering unit is configured to deliver data registered by said sensor elements in the form of image frames, where the at least one image frame of the first resolution contains data from a first set of said sensor elements; and the at least one image frame of the second resolution contains data from a second set of said sensor elements. Consequently, the first and second sets may represent different croppings of the image sensor.

For example, according to one embodiment of the invention, the first set may be associated with a first and relatively low resolution and be equivalent to a so-called full frame, i.e. an image frame containing data from sensor elements located at positions which range over the full width and the full height of the sensor area. Preferably, the image frame of the first resolution is an essentially full frame containing data from sensor elements located at positions which range over at least 80% of the full width and at least 80% of the full height of the sensor area. The second set may be associated with a second and relatively high resolution and be a so-called sub-frame containing data from sensor elements located at positions which range from less than the full width and/or less than the full height of the sensor area, e.g. less than 50% of the full width and/or less than 50% of the full height. Thus, the first set may form a basis for the above-mentioned feature recognition techniques, whereas the second set may be an ROI adapted for tracking one or more identified eye candidates.

According to another preferred embodiment of this aspect of the invention, the eye/gaze tracking apparatus includes a first light source. The control unit is configured to control the first light source in coordination with the operation sequence for the at least one image registering unit. More precisely, this means that the first light source emits light while at least one of the at least one image frame of the second resolution is registered. Naturally, the illumination may be strobed, such that for example the first light source only emits light during a portion of the sensor exposure.

According to yet another preferred embodiment of this aspect of the invention, the eye/gaze tracking apparatus also includes a second light source. The control unit is further configured to control the second light source in coordination with the operation sequence for the image registering unit such that the second light source emits light while at least one image frame of the repeating sequence of image frames is registered.

The employment of such a repeating (and thus) known sequence of image capturing and illumination renders it possible to use information from two or more light sources, and thereby suppress any unfavorably positioned glint/reflections; and at the same time, fulfil the requirements concerning testability and repeatability. For example, it may be advantageous to use one set of light sources when registering the low resolution full format images and another set of light sources when registering high resolution ROI images.

According to still another preferred embodiment of this aspect of the invention, the eye/gaze tracking apparatus only contains a single image registering unit, which is configured to record a single series of images representing the subject. The control unit is here configured to control the operation sequence for the single image registering unit, such that each period of the single series of images contains at least one image frame of the first resolution and at least one image frame of the second resolution. Thereby, the design becomes very compact and uncomplicated.

According to a further preferred embodiment of this aspect of the invention, the at least one image registering unit is configured to produce an image frame of the relatively low resolution by having each data point in the image frame representing combined data from at least two sensor elements in the image sensor (e.g. so-called pixel binning). Alternatively, the at least one image registering unit is configured to produce an image frame of the relatively low resolution by including data from less than all sensor elements in the image sensor in the image frame (i.e. subsampling). The former strategy is generally associated with higher image quality, while the latter is generally quicker.

According to another preferred embodiment of this aspect of the invention, the eye/gaze tracking apparatus contains at least one first image registering unit and at least one second image registering unit. At least one of the at least one first image registering unit is configured to produce image frames of the first resolution and at least one of the at least one second image registering unit is configured to produce image frames of the second resolution. Although such a design may involve somewhat higher cost than a single camera solution it is advantageous with respect to reliability and speed.

According to another aspect of the invention, the object is achieved by the method described initially, wherein the operation sequence for the image registering unit is controlled such that the series of images to be processed represents a repeating sequence of image frames. Further, each period of the repeating sequence of image frames contains at least one image frame of a first resolution and at least one image frame of a second resolution being different from the first resolution. The advantages of this method, as well as the preferred embodiments thereof, are apparent from the discussion above with reference to the proposed apparatus.

According to a further aspect of the invention the object is achieved by a computer program product, which is loadable into the memory of a computer, and includes software adapted to implement the method proposed above when said computer program product is run on a computer.

According to another aspect of the invention the object is achieved by a computer readable medium, having a program recorded thereon, where the program is to make a computer execute the above-proposed method when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED EMBODIMENTS OF THE INVENTION

Figure 1:
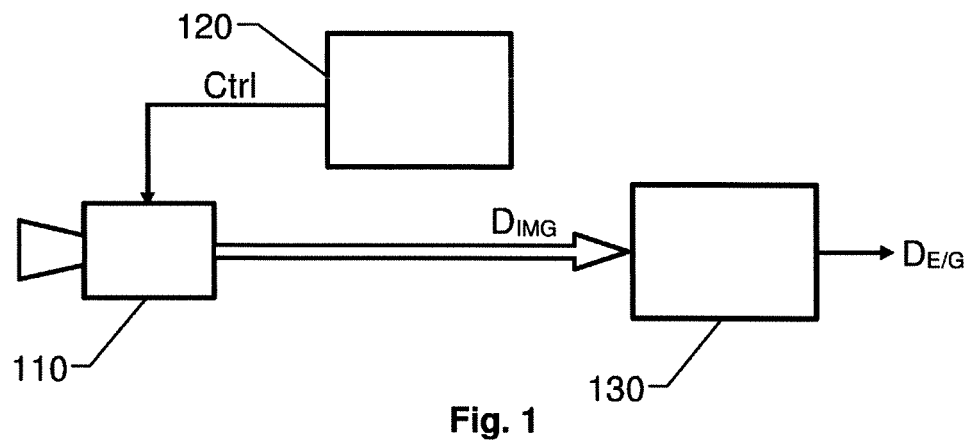
FIGS. 1-4 show eye/gaze tracking apparatuses according to embodiments of the invention.

FIG. 1 shows an eye/gaze tracking apparatus according to a first embodiment of the invention. The eye/gaze tracking apparatus includes an image registering unit 110, a control unit 120 and a data processing unit 130.

The image registering unit 110 is configured to record a series of images $D_{IMG}$ which represent a subject, for instance the face of a person. By means of a control signal Ctrl, the control unit 120 is configured to control an operation sequence for the image registering unit 110 in such a manner that the series of images $D_{IMG}$ represents a repeating sequence of image frames, wherein each period contains at least one image frame of a first resolution (e.g. relatively low) and at least one image frame of a second resolution (e.g. relatively high). The data processing unit 130 is configured to receive the series of images $D_{IMG}$ from the image registering unit 110 and based thereon produce eye/gaze tracking data $D_{E/G}$ with respect to the subject.

As mentioned above, such a repeating sequence of images $D_{IMG}$ with varying resolution levels renders it possible for the data processing unit 130 to produce the eye/gaze tracking data $D_{E/G}$ based on both reliable feature tracking algorithms and high-quality eye/gaze tracking algorithms.

Figure 5:
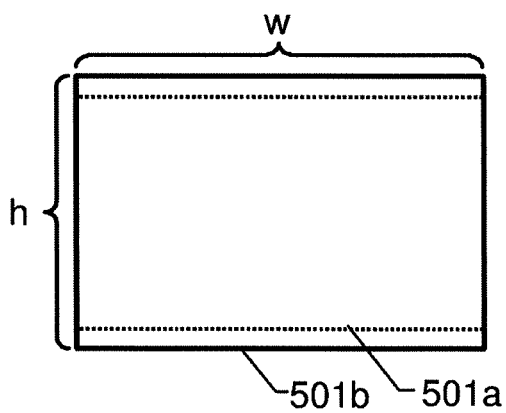
FIG. 5 shows examples of different image frames of the first resolution according to embodiments of the invention.
Figure 6:
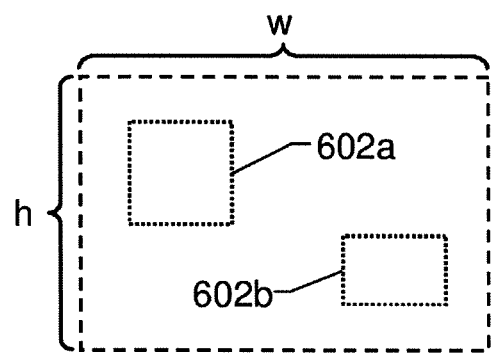
FIG. 6 shows examples of different image frames of the second resolution according to embodiments of the invention.

Further, it is generally advantageous to let the image size vary at least between some image frames of the repeating sequence. FIGS. 5 and 6 show examples of different image sizes, or croppings, in respect of a given image sensor area, such as the one included in the image registering unit 110. The image registering unit 110 contains an image sensor having a set of sensor elements. Specifically, according to one embodiment of the invention, the image registering unit 110 is configured to deliver data registered by the sensor elements in the form of image frames, where the at least one image frame of the first resolution contains data from a first set of said sensor elements. Moreover, the image registering unit 110 is configured to deliver data registered by the sensor elements in the form of image frames, where the at least one image frame of the second resolution contains data from a second set of the sensor elements.

FIG. 5 illustrates a sensor area having a full width w and a full height h over which area the sensor elements are distributed. Here, a so-called full frame 501b is shown, which contains data from sensor elements located at positions ranging over the full width w and the full height h of the sensor area, and is of the first resolution (e.g. a relatively low resolution). According to embodiments of the invention, however, an image frame of the first resolution may equally well contain data from somewhat less than all the rows of the full height h and/or width w of the sensor area. For example, a VGA readout (VGA=Video Graphics Array) from a 5 megapixel sensor area may correspond to sensor elements starting at row 10 and down to row 10 from the bottom, however extending across the full width w of the sensor area. This is illustrated with 501a in FIG. 5. Preferably, a VGA resolution image frame is achieved from a 5 megapixel sensor by reading out essentially the whole sensor area when using 2×2 binning and 2×2 stripping, thus accomplishing a VGA image where each pixel represents the field of view from 4×4 pixels of the sensor.

In fact, the image frame of the first resolution may rather be an essentially full frame containing data from sensor elements located at positions which range over at least 80% of the full width and at least 80% of the full height of the sensor area.

Further, according to embodiments of the invention, the at least one image frame of the second resolution is a sub-frame containing data from sensor elements located at positions which range from less than the full width w and/or less than the full height h of the sensor area, say less than 50% of the full width and/or less than 50% of the full height.

FIG. 6 shows two examples of such ROI, AOI, windows or croppings in the form of 602a and 602b respectively. Given the above VGA example, a typical sub-frame may contain 800×200 pixels. Nevertheless, in practice, the measures may vary slightly from one frame to another, such that for example in image frame n the sub-frame 602b incorporates 801×200 pixels, in image frame n+1 the sub-frame 602b incorporates 799×201 pixels, and so on.

Figure 2:
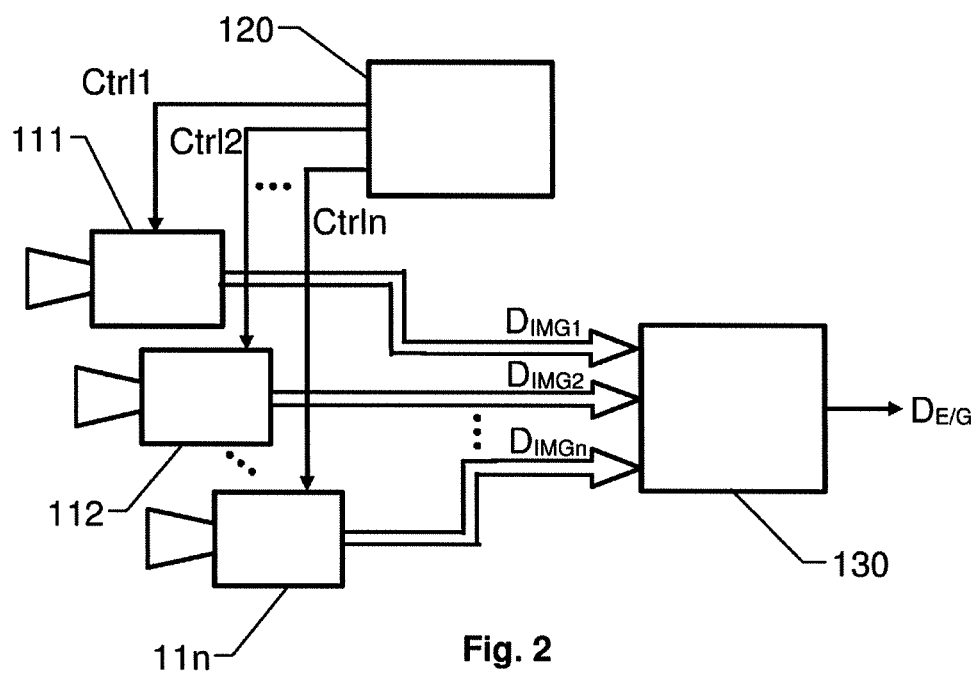

FIG. 2 shows an eye/gaze tracking apparatus according to a second embodiment of the invention. Here, multiple image registering units 111, 112, . . . , 11n are included, which are configured to record a respective series of images $D_{IMG1}$, $D_{IMG2}$, . . . , $D_{IMGn}$ of a subject. Via control signals Ctrl1, Ctrl2, . . . , Ctrln, the control unit 120 is configured to control the operation sequences for the image registering units 111, 112, . . . , 11n in such a manner that the data processing unit 130 receives image frames representing a repeating sequence of image frames, wherein each period contains at least one image frame of a first resolution (e.g. relatively low) and at least one image frame of a second resolution (e.g. relatively high). This may mean that each image registering unit 111, 112, . . . , 11n always produces images of the same resolution, however their outputs are interleaved in time, such that, seen from the data processing unit 130, the resolution level varies over time.

Figure 7:
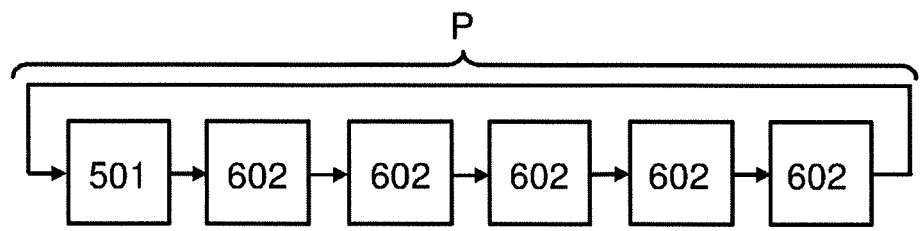
FIG. 7 illustrates an example of a repeating sequence of image frames according to one embodiment of the invention.

FIG. 7 illustrates an example of a repeating sequence of image frames according to one embodiment of the invention, wherein each period P of the repeating sequence of image frames contains one image frame of the first resolution 501 and five image frames of the second resolution 602. It is generally preferred that the single image frame of the first resolution 501 has relatively low resolution and spans over a comparatively large field of view, whereas the five image frames of the second resolution 602 each has relatively high resolution and represents a sub-frame corresponding to a comparatively narrow field of view. Nevertheless, the reverse relationship is also conceivable according to the invention.

Figure 3:
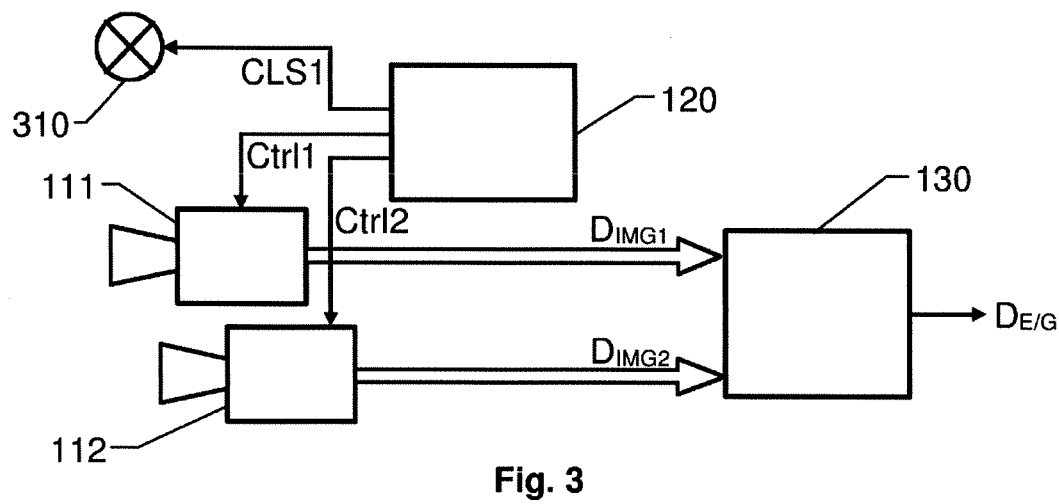

FIG. 3 shows an eye/gaze tracking apparatus according to a third embodiment of the invention. Here, first and second image registering units 111 and 112 are included. The eye/gaze tracking apparatus also contains a first light source 310, which is controllable from the control unit 120 via a first illumination control signal CLS1.

In this embodiment, the control unit 120 is configured to control the first light source 310 in coordination with the operation sequence for the image registering units 111 and 112 such that the first light source 310 emits light while at least one image frame of the second resolution 602 is registered.

Provided that the first image registering unit 111 is configured to register image frames of the first resolution and the second image registering unit 112 is configured to register image frames of the second resolution, the first light source 310 here emits light the second image registering unit 112 is active. However, according to embodiments of the invention, any other combination of resolution level 501 or 602 and illumination is likewise conceivable.

Figure 4:
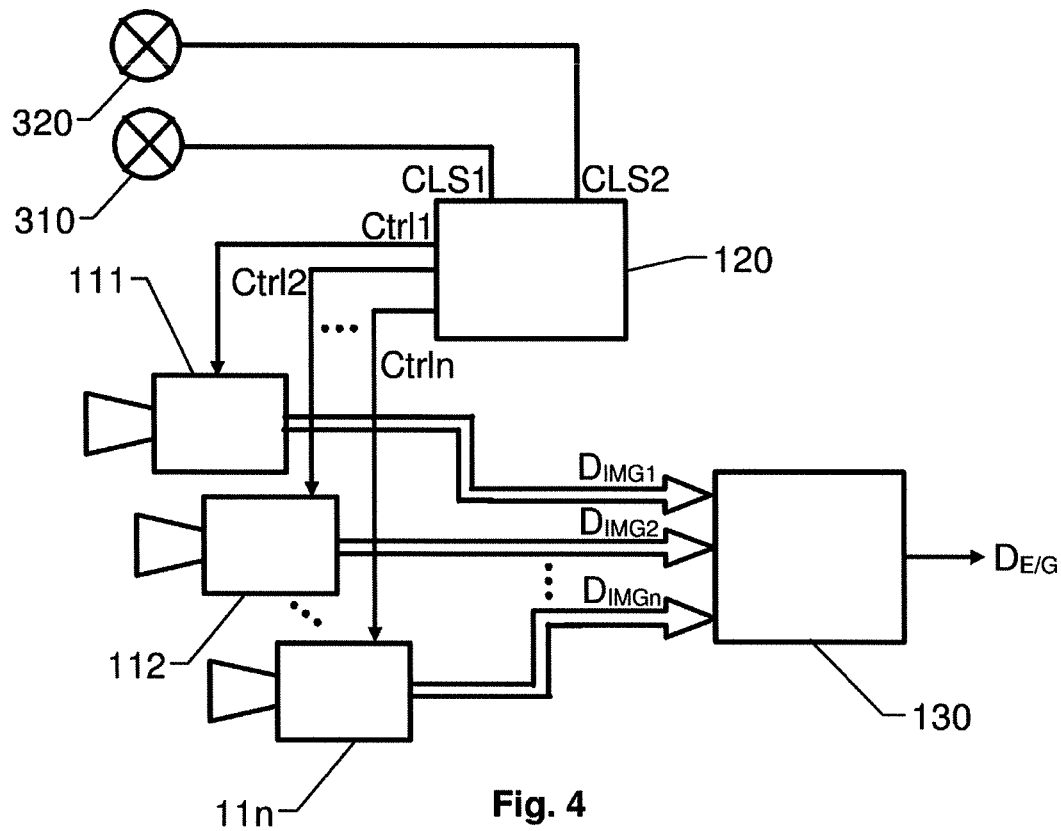

FIG. 4 shows an eye/gaze tracking apparatus according to a fourth embodiment of the invention, wherein a second light source 320 is included, which is controllable by the control unit 120 via a second illumination control signal CLS2 from the control unit 120. More precisely, the control unit 120 is configured to control the first and second light source 310 and 320 respectively in coordination with the operation sequence for the image registering units 111, 112, . . . , 11n, such that the first light source 310 emits light while at least one image frame of the repeating sequence of image frames is registered, and the second light source 320 emits light while at least one other image frame of the repeating sequence of image frames is registered.

For example, if each period P of the repeating sequence of image frames contains three or more image frames, the control unit 120 may control the first and second light sources 310 and 320 such that the first light source 310 emits light while a first image frame is registered, the second light source 320 emits light while a second image frame is registered, and both the first and second light sources 310 and 320 emit light while a third image frame is registered. Alternatively, both the first and second light sources 310 and 320 may be inactive while the third image frame is registered.

Further, if each period P of the repeating sequence of image frames contains four or more image frames, the control unit 120 may be configured to control the first and second light sources 310 and 320, such that the first light source 310 emits light while a first image frame is registered, the second light source 320 emits light while a second image frame is registered, both the first and second light sources 310 and 320 emit light while a third image frame is registered, and neither the first light source 310 nor the second light source 320 emits any light while a fourth image frame is registered.

Figure 8:
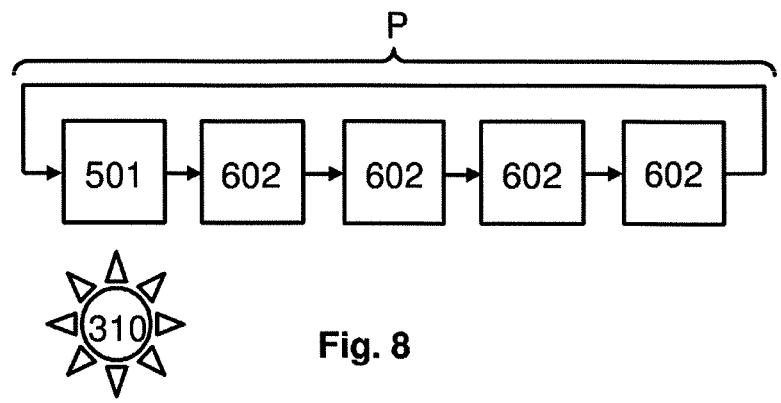
FIGS. 8-16 illustrate examples of repeating sequences of image frames and coordinated schemes for illumination according to embodiments of the invention.

FIG. 8 shows one example of a repeating sequence of image frames according to an embodiment of the invention. Here, the period P is five image frames long, and the registering of image frames is coordinated with a first scheme for illuminating the subject, such that a first light source 310 is controlled to illuminate the subject while a first image frame of a first resolution 501 is registered. Thereafter, while registering the subsequent four image frames of a second resolution 602 the first light source 310 is controlled not to emit any light.

Figure 9:
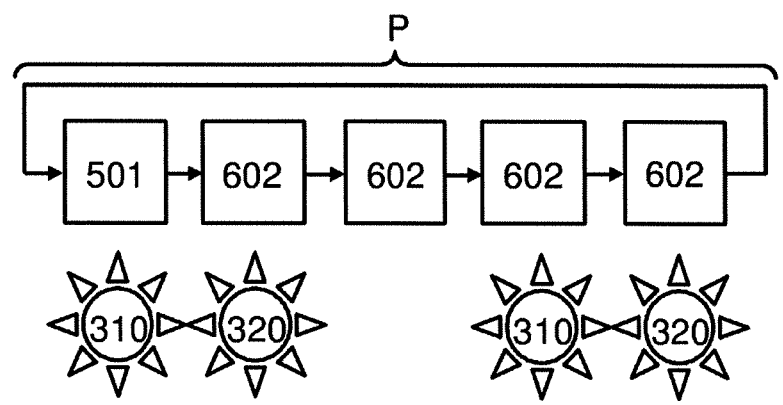

FIG. 9 shows a repeating sequence of image frames according to another embodiment of the invention.

The period P is also here five image frames long, however, the registering of the image frames is coordinated with a second scheme for illuminating the subject. This means that a first light source 310 is controlled to illuminate the subject while a first image frame of a first resolution 501 is registered and while a fourth image frame of a second resolution 602 is registered. A second light source is controlled to illuminate the subject while a second image frame and a fifth image frame of a second resolution 602 are registered. While a third image frame of the second resolution 602 is registered, none of the first or second light sources 310 or 320 is controlled to emit any light.

Figure 10:
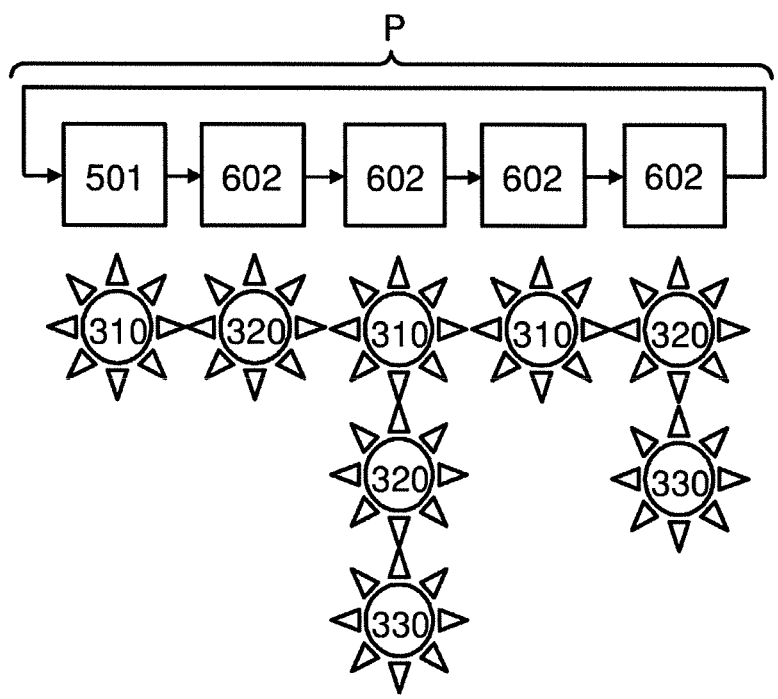

FIG. 10 shows a repeating sequence of image frames according to yet another embodiment of the invention. Again, the period P is five image frames long and a first image frame is of a first resolution 501, whereas the remaining four image frames are of a second resolution 602. Here, however, a first light source 310 is controlled to illuminate the subject while the first, third and fourth image frames are registered, a second light source 320 is controlled to illuminate the subject while the second, third and fifth image frames are registered, and a third light source 330 is controlled to illuminate the subject while the third and fifth image frames are registered.

Figure 11:
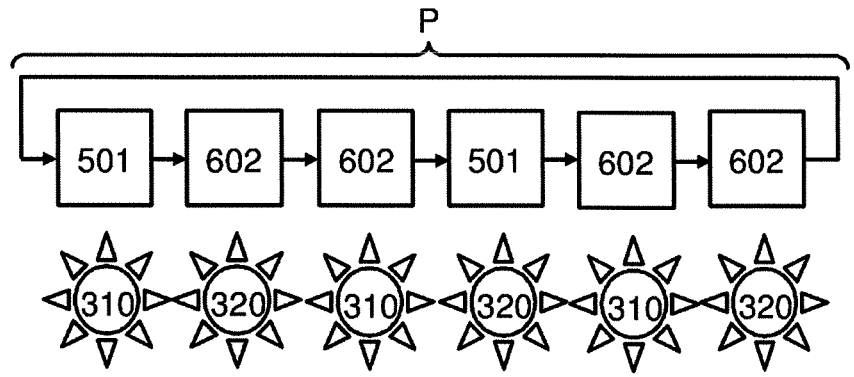

FIG. 11 shows a repeating sequence of image frames according to a further embodiment of the invention. Here, the period P may be of arbitrary length, although in the illustrated example the period P is six image frames long. In any case, a first image frame of a first resolution 501 (e.g. relatively low) is registered, and while registering this image frame a first light source 310 is controlled to illuminate the subject. A second image frame of a second resolution 602 (e.g. relatively high) then follows, and while registering this image frame a second light source 320 is controlled to illuminate the subject. The sequence then continues to register at least one additional image frame of the second resolution 602. In the illustrated example, exactly one such additional image frame is registered. However, any other number of additional image frames of the second resolution 602 is conceivable according to this embodiment of the invention, and while registering these image frames every other time the first light source 310 is controlled to illuminate the subject and every other time the second light source 320 is controlled to illuminate the subject. After that, another image frame of the first resolution 501 follows. This time, since there has been an even number of intermediate image frames of the second resolution 602 and since the illumination switches between the first and second light sources 310 and 320 from one image frame to another, the second light source illuminates the subject. Subsequently, the period P ends and loops back to the start again.

Each of the sequences exemplified in FIGS. 7 to 11 may either be implemented via a single image sensor, or by using two or more different image sensors.

In an implementation employing the approach behind the sequence shown in FIG. 11 it is not necessary to synchronize the image registering with the illumination pattern. Instead, a ROI tracker may be run on a high-resolution sensor together with an illumination system including two light sources, which each is run at, say 30 Hz, to remove a substantial amount of any perceived flicker in the illumination; and where a VGA sensor (or another sensor of lower resolution than that of the high-resolution sensor running in ROI-mode) is run at 27 Hz without being synchronized with the illumination pattern that is produced by the light sources, however still being impacted by it.

Alternatively, the image sensor of the lower resolution may be synchronized with the high-resolution image sensor at any frame rate.

Figure 12:
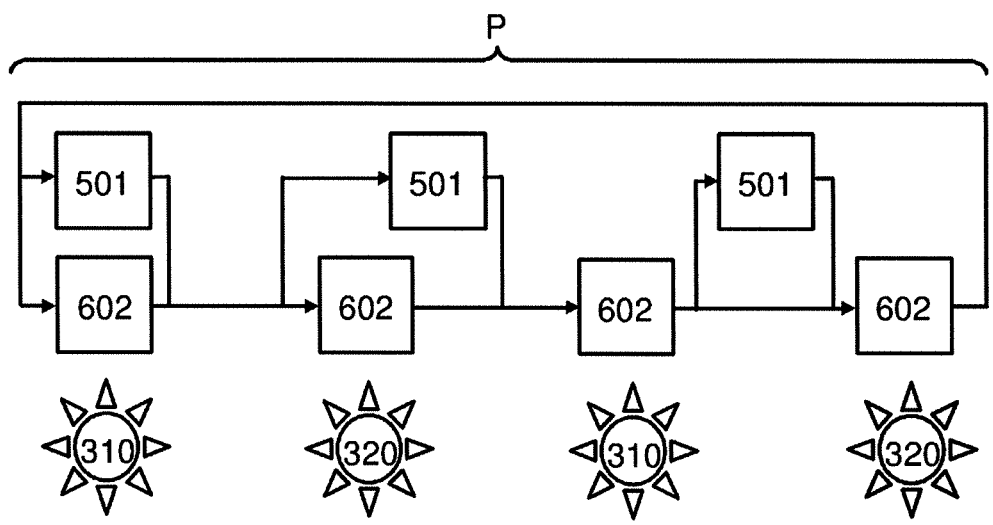

FIG. 12 illustrates an example of a repeating sequence of image frames where first and second light sources 310 and 320 respectively are exclusively synchronized with the registering of the image frames of the second resolution 602, and the light sources 310 and 320 emit light while registering every other image frame of the second resolution 602 in an alternating pattern.

Figure 13:
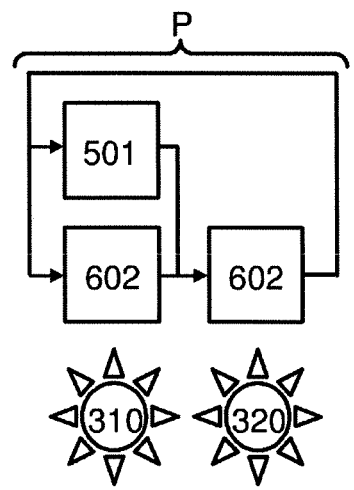

FIG. 13 illustrates another example of a repeating sequence of image frames. Here, both the first and second light sources 310 and 320 are synchronized with the registering of the image frames of the first resolution 501 as well as the registering of image frames of the second resolution 602. Moreover, the image frames 501 and 602 are synchronized with one another, and the light sources 310 and 320 emit light while registering every other image frame of the second resolution 602 in an alternating pattern. However, an image frame of the first resolution is only registered while the first light source emits light.

Figure 14:
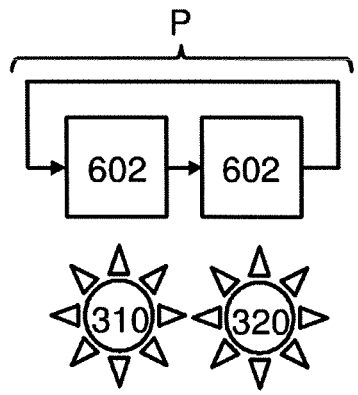
Figure 16:
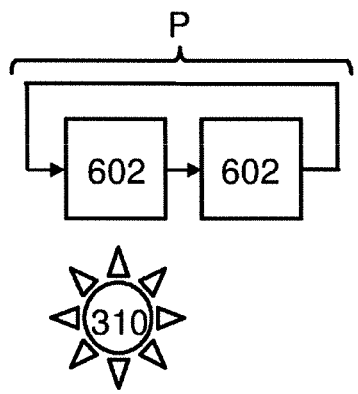

FIG. 14 shows yet another example of a repeating sequence of image frames. Here, the first and second light sources 310 and 320 are both synchronized with the registering of the image frames of the second resolution 602. In every second image frame the first light source 310 is activated, and in every second image frame the second light source 320 is activated. Thus, the period P only includes two steps. In FIG. 16, the same sequence is represented, however where instead of the activating the second light source in every second image frame, no light source is activated.

Figure 15:
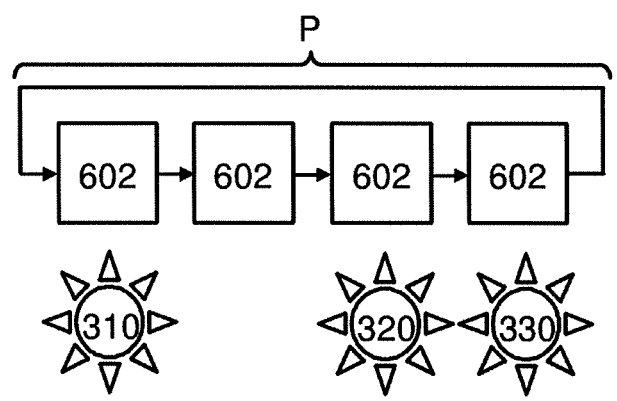

FIG. 15 illustrates an example of a repeating sequence of image frames where exclusively image frames of the second resolution 602 are registered. Here, the three light sources 310, 320 and 330 respectively are activated according to the following repeating sequence. In a first step, while registering a first image, the first light source 310 is active. Then, while registering a second image, no light source is active. Subsequently, while registering a third image, the second light source 320 is active. Finally, while registering a fourth image, the third light source 330 is active. Thereafter, the procedure loops back to the first step again.

As can be seen, there are numerous combinations of repeating sequences of image frames and illumination schemes that can be applied to attain a robust implementation of the eye/gaze tracking apparatus. The specific combination selected may depend on the hardware implementation and the user scenario. For example, a sequence being suitable for a mono camera system is typically different from the most suitable sequence for a dual camera system. Further, a car and a computer control user scenario would generate different need and most likely different sequences. The sequence being most efficient may also depend on the lighting conditions and the characteristic features of the subject. Thus, in one embodiment of the invention, one eye tracking apparatus may support two or more different repeating sequences of image frames and select a particular sequence depending on the situation. Naturally, the present invention is applicable also to other combinations than those specifically described above.

It should be noted that, between different periods P of a sequence as well as during a given period P, various parameters of the image registering unit(s) may be altered, such as a ROI-offset, ROI-size, gain or shutter parameters.

According to one embodiment of the invention, the image registering unit 110, 111, 112 or 11n is configured to produce an image frame of the first resolution 501 by having each data point in the image frame representing combined data from at least two sensor elements in the image sensor, for example by applying pixel binning on groups of four pixels, which either are neighbors to one another or have any other interspatial relationship.

Alternatively, the image registering unit 110, 111, 112 or 11n is configured to produce an image frame of the first resolution 501 by including data from less than all sensor elements in the image sensor in the image frame, for example by subsampling the sensor area.

Preferably, the control unit 120 contains, or is communicatively connected to, a memory unit storing a computer program product, which contains software for causing the control unit 120 to perform the above-described actions when the computer program product is run on the control unit 120.

In a further embodiment of the present invention, an image frame of the first resolution 501 or an image frame of the second resolution 602 may be utilized for feature recognition by the eye/gaze tracking apparatus, or a computer apparatus connected thereto. The feature recognition may provide any of the following functions: the detection of facial gestures, hand gestures, facial features, facial expressions, eye closure, identification data and identity recognition of a person imaged by the image frame and head pose of a person imaged by the image frame.

The feature recognition functions through analysis of an image $D_{IMG}$ whereby the image is analyzed towards a predetermined end. For example, the image may be analyzed to determine the identity of the person imaged in the imaged frame, this is otherwise known as face recognition. Upon recognition of the identity of a person operating the eye/gaze tracking apparatus or a computer apparatus connected thereto, the eye/gaze tracking apparatus or computer apparatus may alter its behavior and functionality.

To perform face recognition the eye/gaze tracking apparatus or a computer apparatus connected thereto may utilize any known facial identification procedure to determine the identity of the person. An example of a suitable procedure is to apply classifiers to the captured image, examples of suitable classifiers are Support Vector Machine, Linear Discriminate Analysis and K-nearest Neighbor classifiers.

Methods for determining gestures, facial expressions, eye closure, head pose etc. would be readily understood by a person skilled in the art. Preferably captured images are analyzed and compared to previously captured images to identify relevant features indicating compliance with a predetermined feature or pattern. For example, in determination of a gesture adjacent captured images may be analyzed to determine differences indicating the performance of a gesture by a person in the captured images.

Figure 17:
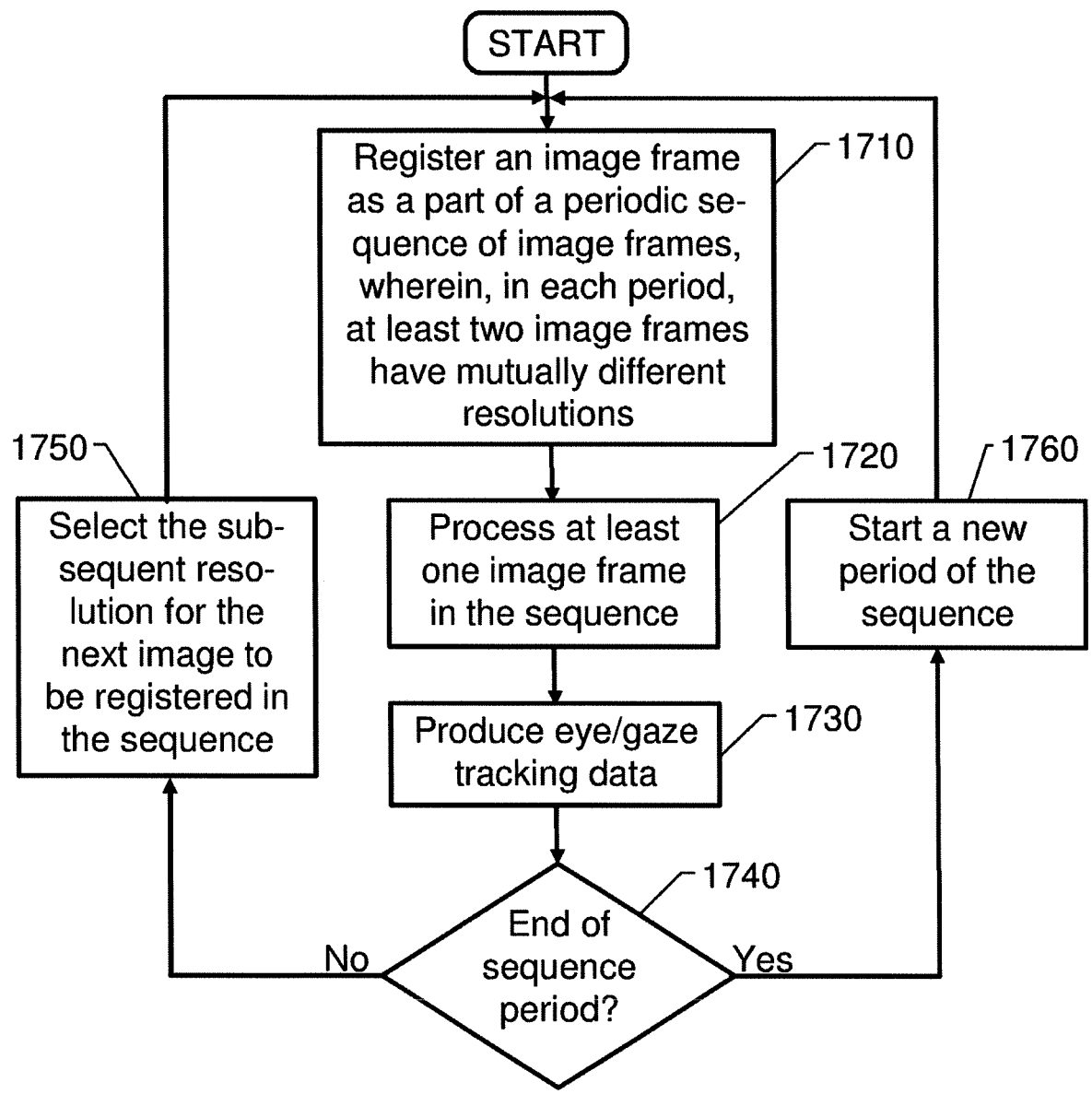
FIG. 17 illustrates, by means of a flow diagram, the general method according to the invention.

In order to sum up, we will now describe the general method according to the invention with reference to the flow diagram in FIG. 17.

In a first step 1710, an image frame is registered which represents a subject and is presumed to be part of a periodic sequence of image frames, wherein, in each period P, at least two image frames have mutually different resolutions, e.g. a first and relatively low resolution and a second and relatively high resolution respectively.

Then, in a step 1720, the image frame registered in step 1710 is processed, possibly together with any previously registered image frames in the sequence of image frames. Based on this processing, a subsequent step 1730 produces eye/gaze tracking data.

Thereafter, a step 1740 checks if the image frame registered in step 1710 was the last image frame, i.e. if the end of the period P has been reached. If so, i.e. if the image frame registered in step 1710 was in fact the last frame in the periodic pattern, the procedure continues to step 1760. Otherwise, i.e. if there is at least one more image frame in the periodic pattern, the procedure continues to step 1750.

In step 1750, a resolution is selected, which is to be applied for the subsequent image frame in the sequence of image frames given the periodic pattern. Then, the procedure loops back to step 1710.

In step 1760, a new period P of the sequence of image frames is started. Of course, this also means selecting a resolution, which is to be applied for the subsequent image frame in the sequence of image frames given the periodic pattern, namely the resolution of the first image frame in the sequence. Then, the procedure loops back to step 1710.

It should be noted that any of these steps may be performed concurrently, or in an order differing from the above-defined. Specifically, the selection of a resolution for the subsequent image frame may be performed before the current image frame is processed. By way of example, many image sensors require the setup of resolution and other sensor parameters for registering image frame n+1 simultaneously to the registration of image frame n.

Further, all of the process steps, as well as any subsequence of steps, described with reference to FIG. 17 above may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any non-transitory entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An eye/gaze tracking apparatus comprising:
at least one image registering unit configured to record at least one series of images representing a subject;
a control unit configured to control an operation sequence for the at least one image registering unit; and
a data processing unit configured to receive an at least one predetermined period comprising a series of images from the at least one image registering unit, and based on the at least one predetermined period produce eye/gaze tracking data with respect to the subject,
wherein the control unit is configured to control the operation sequence for the at least one image registering unit such that the at least one predetermined period of series of images received by the data processing unit represents a repeating sequence of image frames containing at least one image frame of a first resolution and at least one image frame of a second resolution being different from the first resolution,
wherein within the at least one predetermined period, the predetermined period contains at least one image frame of the first resolution and at least one image frame of the second resolution,
wherein the at least one image registering unit comprises an image sensor having a set of sensor elements, and delivers data registered by said sensor elements in the form of said image frames, wherein
the at least one image frame of the first resolution contains data from a first set of said sensor elements; and
the at least one image frame of the second resolution contains data from a second set of said sensor element, and
wherein said sensor elements are distributed over a sensor area having a full width and a full height, and the at least one image frame of the first resolution is an essentially full frame containing data from sensor elements located at positions which range over at least 80% of the full width and at least 80% of the full height of the sensor area.

2. The eye/gaze tracking apparatus according to claim 1, wherein the predetermined period includes a sequence of image frames having a first image frame of a first resolution followed in sequence by two or more second image frames of a second resolution.

3. The eye/gaze tracking apparatus according to claim 1, wherein the first resolution is lower than the second resolution.

4. The eye/gaze tracking apparatus according to claim 3, further comprising a first light source, and the control unit is configured to control the first light source in coordination with the operation sequence for the at least one image registering unit such that the first light source emits light while at least one of the at least one image frame of the second resolution is registered.

5. The eye/gaze tracking apparatus according to claim 1, wherein the at least one image frame of the first resolution is used for eye/gaze tracking and the second resolution is used for feature recognition of an imaged subject.

6. The eye/gaze tracking apparatus according to claim 1, wherein the at least one image registering unit comprises an image sensor having a set of sensor elements, and the at least one image registering unit is configured to deliver data registered by said sensor elements in the form of said image frames, wherein the at least one image frame of the first resolution contains data from a first set of said sensor elements; and the at least one image frame of the second resolution contains data from a second set of said sensor elements.

7. A method of producing eye/gaze tracking data with respect to a subject, the method comprising:

registering, via at least one respective image registering unit, an at least one predetermined period comprising a series of images representing the subject;

processing the series of images from the at least one predetermined period;

producing the eye/gaze tracking data based on the at least one predetermined period; and controlling an operation sequence for the at least one image registering unit such that the at least one predetermined period of series of images received by the data processing unit represents a repeating sequence of image frames containing at least one image frame of a first resolution and at least one image frame of a second resolution being different from the first resolution, wherein within the at least one predetermined period, the predetermined period contains at least one image frame of the first resolution and at least one image frame of the second resolution, wherein the at least one image registering unit comprises an image sensor having a set of sensor elements, and the method comprises delivering data registered by said sensor elements in the form of said image frames, wherein the at least one image frame of the first resolution contains data from a first set of said sensor elements; and the at least one image frame of the second resolution contains data from a second set of said sensor element, and wherein said sensor elements are distributed over a sensor area having a full width and a full height, and the at least one image frame of the first resolution is an essentially full frame containing data from sensor elements located at positions which range over at least 80% of the full width and at least 80% of the full height of the sensor area.

8. The method according to claim 7, wherein said sensor elements are distributed over a sensor area having a full width and a full height, and the at least one image frame of the second resolution is a sub-frame containing data from sensor elements located at positions which range from less than 50% of the full width and/or less than 50% of the full height of the sensor area.

9. The method according to claim 7, wherein the first resolution is lower than the second resolution.

10. The method according to the claim 9, comprising controlling a first light source, in coordination with the operation sequence for the at least one image registering unit such that the first light source emits light while registering at least one of the at least one image frame of the second resolution.

11. The method according to claim 10, comprising controlling a second light source, in coordination with the operation sequence for the at least one image registering unit such that the second light source emits light while registering at least one image frame of the repeating sequence of image frames.

12. The method according to claim 9, comprising producing an image frame of the first resolution by having each data point in the image frame representing combined data from at least two sensor elements in the image sensor.

13. The method according to claim 9, comprising producing an image frame of the first resolution by including data from less than all sensor elements in the image sensor in the image frame.

14. The method according to claim 9, comprising recording the at least one single series of images representing the subject via at least one first image registering unit; and at least one second image registering unit, wherein the at least one first image registering unit producing image frames of the first resolution and at least one of the at least one second image registering unit producing image frames of the second resolution.

15. The method according to claim 7, wherein at least one image frame is analyzed to determine the presence of at least one of a facial gesture, hand gesture, facial feature, facial expression, eye closure, or head pose of a person imaged by the image frame.

16. The method apparatus according to claim 7, wherein at least one image frame is analyzed to identify a user of the eye/gaze tracking apparatus.

17. The method according to claim 16, wherein the at least one image frame being analyzed to identify a user of the eye/gaze tracking apparatus is of the first resolution.

18. A computer program product located on a non-transitory computer readable medium, comprising instructions for operation by a computing device, said instructions comprising:

instructions configured for registering, via at least one respective image registering unit, an at least one predetermined period comprising a series of images representing the subject;

instructions configured for processing the series of images from the at least one predetermined period;

instructions configured for producing the eye/gaze tracking data based on the at least one predetermined period; and instructions configured for controlling an operation sequence for the at least one image registering unit such that the at least one predetermined period of series of images received by the data processing unit represents a repeating sequence of image frames containing at least one image frame of a first resolution and at least one image frame of a second resolution being different from the first resolution, wherein within the at least one predetermined period, the predetermined period contains at least one image frame of the first resolution and at least one image frame of the second resolution, wherein the at least one image registering unit comprises an image sensor having a set of sensor elements, and the method comprises delivering data registered by said sensor elements in the form of said image frames, wherein the at least one image frame of the first resolution contains data from a first set of said sensor elements; and the at least one image frame of the second resolution contains data from a second set of said sensor element, and wherein said sensor elements are distributed over a sensor area having a full width and a full height, and the at least one image frame of the second resolution is a sub-frame containing data from sensor elements located at positions which range from less than 50% of the full width and/or less than 50% of the full height of the sensor area.

\* \* \* \* \*